United States Patent Office 3,796,716
Patented Mar. 12, 1974

3,796,716
PRODUCTION OF o-AMINOPHENYLACETIC ACID
Takayuki Naito, Tokyo, and Jun Okumura, Yokohama, Japan, assignors to Bristol-Myers Company, New York, N.Y.
No Drawing. Filed Mar. 22, 1972, Ser. No. 236,981
Int. Cl. C07d 33/16
U.S. Cl. 260—289 R     1 Claim

ABSTRACT OF THE DISCLOSURE

Yields in the production of o-aminomethylphenylacetic acid are improved by first reacting 2-indanone with sodium azide and sulfuric acid to produce o-aminomethylphenylacetic acid lactam which is then refluxed in hydrochloric acid to produce o-aminomethylphenylacetic acid hydrochloride.

BACKGROUND OF THE INVENTION (1) Field of the invention.—This invention provides improved chemical processes for the production of 3-oxotetrahydroisoquinoline, which is also called 3-hydroxy-1,2-dihydroisoquinoline, 1,4-dihydro-3(2H)-isoquinolone and o-aminomethylphenylacetic acid lactam, and for its conversion to o-aminomethylphenylacetic acid and its salts.

(2) Description of the prior art.—1,4-dihydro-3(2H)-isoquinolone (Chem. Abst. 47, 3813f) has the structure

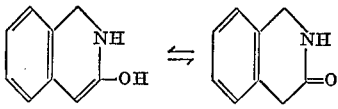

It has been reported, for example, in Chemical Abstracts 20, 392, in Beilstein 21, II, 255, by V. Braun et al., Annalen, 445, 240 (1925) and by R. Huisgen et al., Annalen 575, 197–216 [C.A. 47, 3813f].

o-Aminomethylphenylacetic acid has the structure

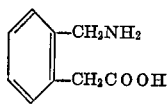

It was prepared, for example, by V. Braun (ibid.). It was also prepared by a lengthy and laborious synthesis by J. Haginiwa et al., J. Pharm. Soc. Japan, 79 (12), 1578–1581 (1959). Haginawa et al. then acylated the amino group and heated the resulting amides with soda lime to produce a series of 3-substituted-isoquinolines.

o-Aminomethylphenylacetic acid was also synthesized laboriously by R. U. Lemieux and R. Raap as disclosed in their U.S. patent application Ser. No. 142,337 filed May 11, 1971. Lemeiux et al. used this acid, after appropriate blocking of the free amino group, to acylate 7-aminocephalosporanic acid and derivatives thereof and thus, after removal of the blocking group, to produce potent antibacterial agents such as the compound of the formula

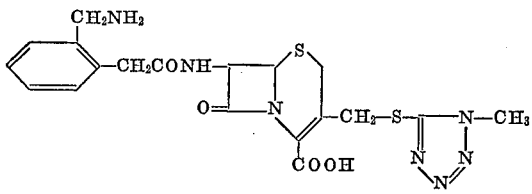

SUMMARY OF THE INVENTION

This invention includes the improved process for the production of o-aminomethylphenylacetic acid lactam which comprises cooling below 40° C. a suspension of freshly prepared 2-indanone and about an equal weight of sodium azide in a substantially anhydrous organic solvent, preferably chloroform, and then gradually adding concentrated sulfuric acid to said suspension while maintaining the temperature of the mixture below 40° C.

This invention also includes the improved process for the production of o-aminomethylphenylacetic acid hydrochloride which comprises heating, preferably to reflux, a mixture of o-aminomethylphenylacetic acid lactam and concentrated hydrochloric acid.

The improved procedures of the present invention are provided by Schmidt rearrangement of 2-indanone followed by hydrolysis of the resulting lactam according to the following equation:

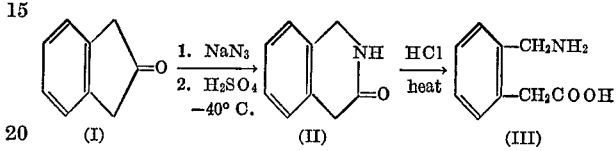

Organic Syntheses 41, 53 (1961).

2-indanone (I) was prepared from indene according to a procedure described in Organic Syntheses (ibid.). When a technical grade reagent of indene is used, the yield of 2-indanone will decrease to around 45% (see note 2 of Organic Syntheses). 2-indanone thus prepared was used as soon as possible because of a description in note 7 of Organic Syntheses that 2-indanone is unstable to air at room temperature.

Hydrolysis of the δ-lactam (II) was carried out successfully using hydrochloric acid to give the amino acid (III) in 79% yield. Barium hydroxide was also used for the hydrolysis but the yield was 32%.

DESCRIPTION OF THE PREFERRED EMBODIMENTS

Example 1 o-Aminomethylphenylacetic acid δ-lactam (II).—To a cooled suspension of 12.3 g. (0.093 mole) of freshly prepared 2-indanone (I) and 13.0 g. (0.2 mole) of sodium azide in 500 ml. of chloroform was carefully added dropwise 50 ml. of concentrated sulfuric acid at such a rate as to maintain the temperature below 40° C. under stirring. After the addition was completed and the heat evolution ceased, the mixture was stirred at room temperature for an additional two hours and then poured into 400 g. of crushed ice. The chloroform layer was separated and the aqueous layer was extracted with three 300 ml. portions of chloroform. The chloroform layer was combined with the chloroform extracts, dried with anhydrous sodium sulfate and concentrated under reduced pressure to afford crystalline precipitate, which was collected by filtration and recrystallized from 250 ml. of n-hexane-benzene (1:1) to give 12.0 g. (88%) of the desired product (II). Colorless prisms. M.P. 152–153° C.
IR (KBr): $\gamma_{max.}$ (cm.$^{-1}$) 3200, 3050, 1660, 1500, 745.
NMR (CDCl$_3$): δ (p.p.m. from TMS) 3.50 (2H, t, 1,5 Hz.), 4.40 (2H, br.–s., converted to a triplet (J=1.5 Hz.) by an addition of D$_2$O), 7.06 (4H, s.), 7.45 1H, br.–s., disappeared by an addition of D$_2$O).
Analysis.—Calcd. for C$_9$H$_9$NO (percent): C, 73.45; H, 6.16; N, 9.52. Found (percent): C, 73.73; H, 6.08; N, 9.23.

Example 2 o-Aminomethylphenylacetic acid δ-lactam (II).—Ten milliliters of sulfuric acid was added to a stirred suspension of 1.32 g. (0.01 mole) of freshly prepared 2-indanone (I) in 50 ml. of chloroform and to the mixture was added portionwise 1.30 g. (0.02 mole) of sodium azide at room temperature under stirring. After stirring for half an hour, the reaction mixture was poured into 200 ml. of ice-water and extracted with two 100 ml. portions of chloroform. A large amount of insoluble material which appeared during the extraction procedure was filtered off. The chloroform extracts were combined, dried on anhydrous sodium sulfate, treated with active carbon and filtered. Evaporation of the filtrate followed by recrystallization of the residue from 100 ml. of alcohol-n-hexane (1:1) gave the δ-lactam (II) melting at 150–152° C. Yield 0.48 g. (32%).

Example 3 o-Aminomethylphenylacetic acid (III).—A mixture of 7.37 g. (0.05 mole) of II and 50 ml. of concentrated hydrochloric acid was refluxed for 3 hours and the reaction mixture was treated with 1.0 g. of active carbon and filtered. The filtrate was concentrated to dryness under reduced pressure to give 8.5 g. as the crystalline residue. Recrystallization from 400 ml. of aqueous acetone (acetone:water=10:1) gave 8.0 g. (79%) of hydrochloride of the desired amino acid (III). Colorless plates. M.P. 163–164° C. (lit. 154° C.).

IR (KBr): $\gamma_{max}$(cm.$^{-1}$) 1695, 1610, 1585, 1230, 1180.

NMR (DMSO—d$_6$): δ(p.p.m. from TMS) 3.69 (2H, s.), 3.94 (2H, s.), 4.10–4.7 (3H, broad), 7.0–7.5 (4H, m.), 7.6–8.7 (1H, broad).

Analysis.—Calcd. for $C_9H_{11}NO_2$·HCl (percent): C, 53.60; H, 6.00; N, 6.95; Cl, 17.58. Found (percent): C, 53.74; H, 5.98; N, 6.79; Cl, 17.94.

Example 4 o-Aminomethylphenylacetic acid (III).—A mixture of 340 mg. (2.3 mmoles) of II and 730 mg. (2.3 mmoles) of barium hydroxide octahydrate in 20 ml. of water was heated in a sealed tube at 150° C. for one hour. The reaction mixture was cooled to room temperature and 300 mg. (2.5 mmoles) of ammonium carbonate was added to precipitate barium carbonate which was filtered and washed well with 50 ml. of water. The aqueous filtrate was combined with the washings and evaporated to dryness. The residue was crystallized from 5 ml. of 50% aqueous alcohol to give 163 mg. (30%) of colorless plates which was identical with the free amino acid obtained from the hydrochloride by neutralization with ammonium hydroxide, M.P. 180–182° C.

IR (KBr): $\gamma_{max}$ (cm.$^{-1}$) 3100–2200, 1660–1500, 1400, 1380, 770, 755, 720.

NMR (CF$_3$COOH): δ(p.p.m. from TMS) 3.96 (2H, br.–s.), 4.45 (2H, br.–s), 6.3–8.0 (3H, br.), 7.38 (4H, s.).

Analysis.—Calcd. for $C_9H_{11}NO_2$ (percent): C, 65.44; H, 6.71; N, 8.48. Found (percent): C, 65.24; H, 6.47; N, 8.31.

Example 5 o-Aminomethylphenylacetic Acid Lactam (II).—In a 2 liter three-necked round-bottom flask, fitted with a reflux condenser, drying tubing, overhead stirrer, thermometer, and a 100 ml. dropping funnel, are placed 24.6 g. (0.186 mole) of 2-indanone and 26 g. (0.4 mole) of sodium azide in 1 liter of chloroform. The suspension is stirred and to it added dropwise 100 ml. of concentrated sulfuric acid at such a rate to maintain the temperature between 33–37° C. (Note 1). After the addition is complete the reaction mixture is stirred at room temperature for an additional 2 hours, and then poured into 800 g. of crushed ice. The chloroform layer is separated and the aqueous phase is extracted 3 times with 300 ml. portions of chloroform. The aqueous phase is treated with sodium nitrate (Note 2). The chloroform extracts are combined, dried over magnesium sulfate (anhydrous) and evaporated to dryness. The solid is redissolved in 150 ml. of hot water and treated with 2.0 g. of charcoal ("Darko KB") while hot. The solution is filtered and the charcoal is washed 3 times with 25 ml. portion of hot water. The solution is cooled, and the solid is collected by filtration. It is washed with 10–20 ml. of ice-cold water, and dried in a vacuum desiccator over P$_2$O$_5$. The product melts at 144–145° C.; 18.3 g. (yield 69%).

NOTES

1. *Caution:* During the sulfuric acid addition, hydrozoic acid is evolved. Hydrazoic acid boils at 38–39° C., therefore, the temperature must be maintained *below 40° C.* The entire experiment should be carried out in a well ventilated hood.
2. Residual hydroxoic acid in the aqueous phase is decomposed by adding slowly sodium nitrite until a positive test is obtained with iodine paper and/or ferric chloride solution.

Example 6 o-Aminomethylphenylacetic acid hydrochloride (III).—In a 500 ml. round-bottom flask, fitted with a reflux condenser, and a magnetic stirrer, is placed 10.1 g. (0.075 moles) of II and 100 ml. of concentrated hydrochloric acid. The mixture is then refluxed for 3 hours. While hot, the reaction mixture is treated with 2.0 g. of charcoal ("Darko KB") for 5 minutes, and filtered. The filtrate is concentrated to dryness at 50–6°/15 mm. and finally at high vacuum over P$_2$O$_5$ (Note 1). The solid is recrystallized from a preformed mixture of acetone:water, 15:1 (Note 2). The hydrochloride is dried in a vacuum desiccator over P$_2$O$_5$. The yield of the pure product, melting at 188–190°, is 11.4 g. (78%).

Analysis.—Calcd. for $C_9H_{12}NO_2Cl$ (percent): C, 53.73; H, 5.97; N, 6.96; Cl, 17.66. Found (percent): C, 53.56; H, 6.02; N, 6.89; Cl, 17.76.

NOTES

1. For a successful recrystallization absolutely dry material is needed.
2. The ratio of acetone to water may vary, depending on the dryness of the crude hydrochloride.

We claim:

1. The process for the production of o-aminomethylphenylacetic acid lactam which consists essentially of cooling below 40° C. a suspension of freshly prepared 2-indanone and about an equal weight of sodium azide in substantially anhydrous chloroform, and then gradually adding concentrated sulfuric acid to said suspension while maintaining the temperature of the mixture below 40° C.

References Cited

UNITED STATES PATENTS

| | | | |
|---|---|---|---|
| 2,785,159 | 3/1957 | Hoffmann | 260—239.3 B |
| 3,403,157 | 9/1968 | Humber | 260—289 R |
| 3,458,578 | 7/1969 | Galaniay | 260—283 SY |
| 3,686,165 | 8/1972 | Loev | 260—239.3 B |
| 3,480,634 | 11/1969 | Finkelstein | 260—289 R |
| 3,663,557 | 5/1972 | DeRyckere | 260—289 R |

OTHER REFERENCES

Horan et al., Org. Syntheses vol. 41, p. 53 (1961).

DONALD G. DAUS, Primary Examiner

U.S. Cl. X.R.

260—243 C, 283 SY, 518 R, 590